No. 862,237. PATENTED AUG. 6, 1907.
R. G. COYNER.
MEANS FOR PROPELLING CARS.
APPLICATION FILED OCT. 8, 1906.
2 SHEETS—SHEET 1.
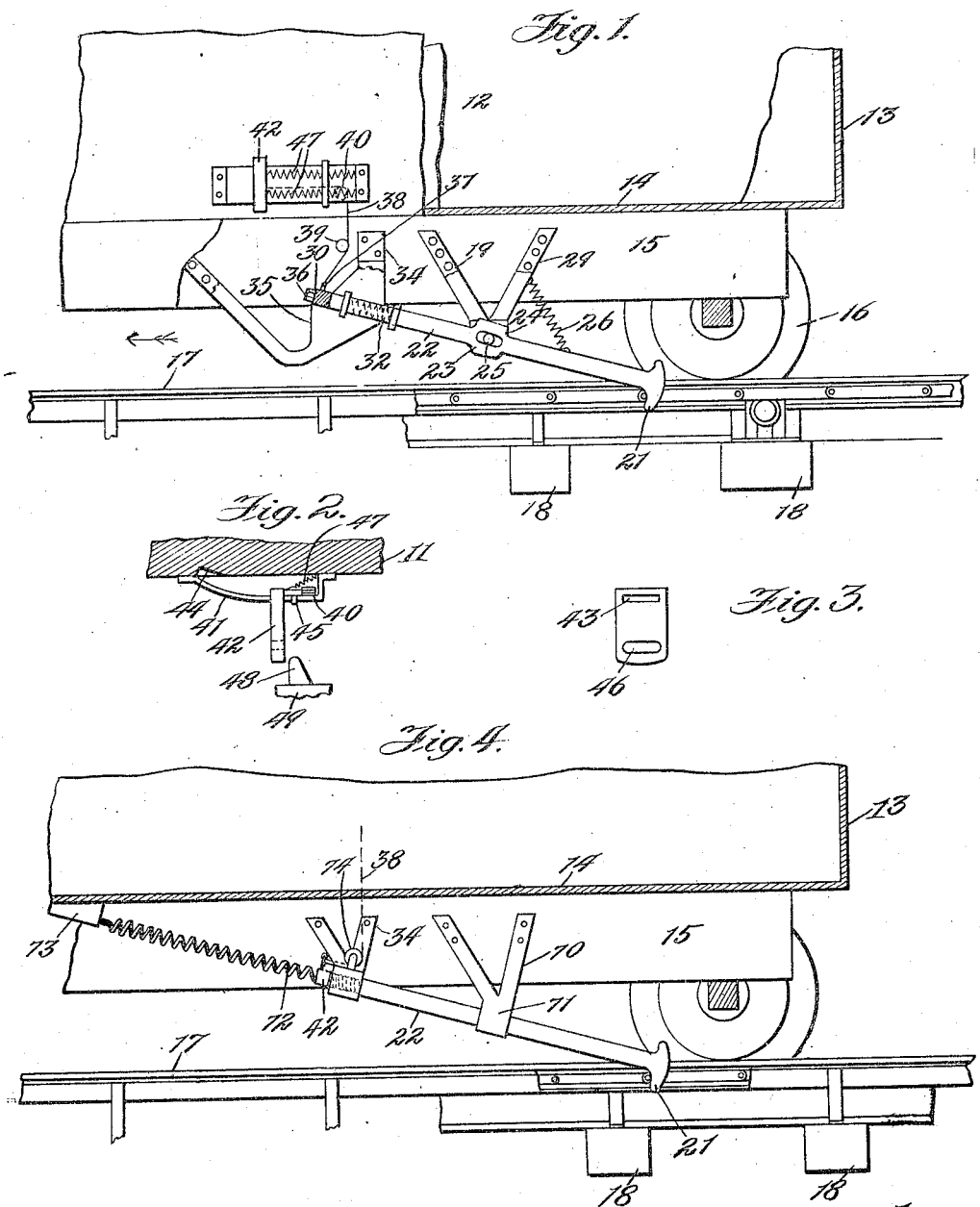
Witnesses:
Inventor:
Robert G. Coyner
By Jno. G. Elliott
Atty.

No. 862,237. PATENTED AUG. 6, 1907.
R. G. COYNER.
MEANS FOR PROPELLING CARS.
APPLICATION FILED OCT. 8, 1906.
2 SHEETS—SHEET 2.
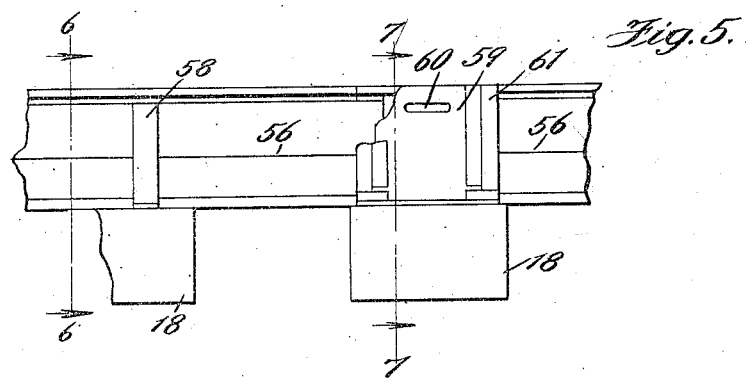
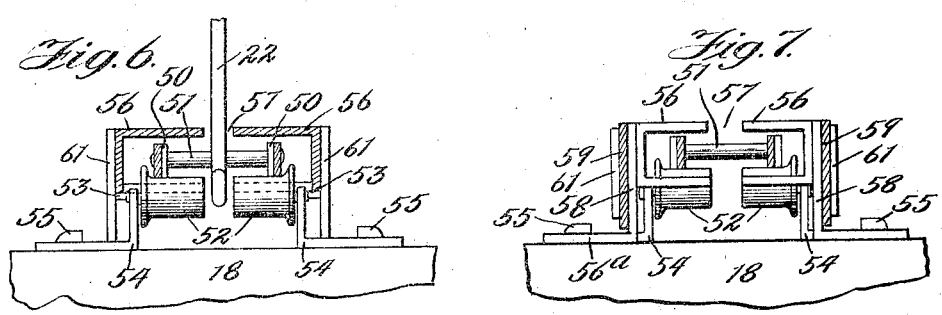
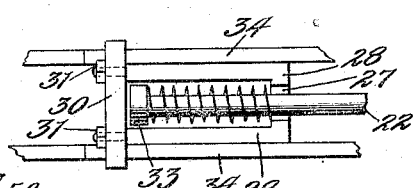
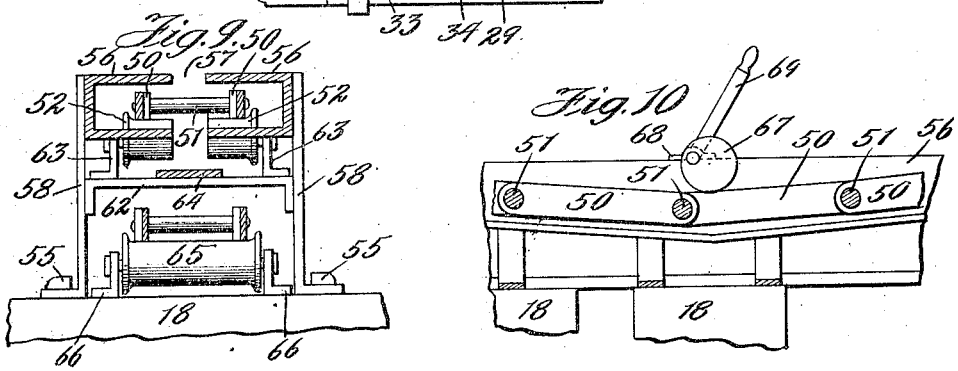

UNITED STATES PATENT OFFICE.

ROBERT G. COYNER, OF CHICAGO, ILLINOIS.

MEANS FOR PROPELLING CARS.

No. 862,237.  Specification of Letters Patent.  Patented Aug. 6, 1907.

Application filed October 3, 1906. Serial No. 337,849.

*To all whom it may concern:*

Be it known that I, ROBERT G. COYNER, a citizen of the United States, and a resident of Chicago, in the county of Cook and State of Illinois, have invented certain new and useful Means for Propelling Cars.

This invention relates to means for the propelling of cars, the necessities for the use of which require their propulsion from one point to another on a track in which of necessity there may be one or more inclines varying in angle, and stops of a car, frequently required at both predetermined and undetermined intervals thereof, necessitating the disconnection of a car from and its connection with, means of propulsion not supported by the car.

The prime object of my invention is to propel a car by means of a chain or rope transmission means between which the car and holding device supported by the car may be connected with and disconnected from its transmission means at substantially any point thereof both when the car is stationary and moving.

A further object is to propel a car by a chain or rope transmission means, the structure of which is of such a character that it will quickly and entirely clear itself of materials falling from a car upon or therein and that the holding device connecting a transmission means with the car cannot be injured by or engage the transmission supports or its adjacent underneath returned portions.

Another object is to provide a simple and perfective means for cushioning the car against the force of an unavoidable jerk following the initial connection of the car with its transmission means.

A further object is to provide means for automatically connecting and disconnecting a car from its transmission means both when moving and stationary and at any predetermined point of its travel therewith.

Another object is to provide means by which the car is automatically disconnected from its transmission when moved in the same direction and faster than the transmission means, and by which the car is maintained against accidental connection with its transmission.

A still further object is to provide means by which the bearings of the pulleys supporting the transmission means are inclosed and so supported that they are always readily accessible and conveniently removable without disturbing other parts of the structure.

With these ends in view, my invention consists in certain features of novelty in the construction, combination and arrangement of parts, by which the said objects and certain other objects hereinafter appearing are attained, all as fully described with reference to the accompanying drawings, and more particularly pointed out in the claims.

In the said drawings: Figure 1 illustrates in side elevation a car partly in longitudinal section, the transmission means for propelling the same and, partly in section, the devices for connecting with and disconnecting the car from its transmission means. Fig. 2 is a detail showing in plan means for actuating the connection between the car and its transmission means and which may be adapted for automatically actuating said connection. Fig. 3 is a front elevation of the sliding stop shown in Fig. 2. Fig. 4 a longitudinal section of a car showing a modification of the connecting hook bar between the car and a chain transmission means. Fig. 5 is a detail side elevation indicating the location of the supports for the transmission and the means by which said supports are rendered accessible and removable therefrom. Fig. 6 is a section on the line 6—6 of Fig. 5, looking in the direction of the arrows. Fig. 7 a similar view on the line 7—7 of Fig. 5 looking in the direction of the arrows. Fig. 8 a top plan view of the devices employed for removing the car from the force of a jerk resulting at the instant of the connection of the car with its transmission means with the forward portion of the connecting hook bar broken off. Fig. 9 a transverse section through supporting devices for a chain or cable transmission means in which the forward and return portions thereof are supported adjacent each other instead of the lower portion remaining suspended in mid-air or at considerable distance from the upper portion as may be, and Fig. 10 a detail longitudinal section through the transmission means and its supports showing the employment of an eccentric for depressing a chain or cable away from and out of contact with the connections of the car therewith.

Similar numerals of reference indicate the same parts in the several figures of the drawings.

As my invention is especially designed for use in connection with the transportation of small carloads of ore and the like, 11 and 12 indicate the side boards and 13 one of the end boards of a box car, the bottom 14 of the box of which is secured to and supported, as shown, upon longitudinal sills, two of which are about the middle of the car and of which one is indicated at 15 which car by means of wheels 16 runs upon trackrails 17 supported in the usual manner upon crossties 18.

Suspended from the sill by a bracket 19 secured thereto by bolts 20 is a hook or other catch device 21 connected with or forming an integral part of, an elongated shank or bar 22 through the side face 23 of which is an elongated slot 24 through which passes a pivot 25 secured to the bracket and supporting the bar 22 in such a way that it may be both oscillated and reciprocated on the pivot as hereinafter more specifically described for engaging and disengaging the hook from the power transmission means for the car.

Secured to the hook-bar 22 at a point between its bearing and the hook is a spring 26, one end of which is attached to the bar and the other to the bracket 19, the operation of which spring is to automatically maintain the hook out of engagement and in a plane above the power transmission devices when it is desirable to have the car disconnected therefrom.

The rear end of the bar 22 (see Fig. 8) passes through an enlarged opening 27 in the end-bar 28 of a yoke, the legs 29—29 of which are connected by a cross-head 30 secured thereto by bolts 31—31 and projecting beyond both legs 29—29 for the purpose hereinafter described.

Coiled about the rear end of the hook-bar 22 (see Figs. 1 and 8) is a spring 32 one end of which bears against the end-bar 28 of the yoke and the other against an enlarged flange or nut 33 on the end of the hook-bar, the hook-bar being maintained against any considerable lateral movement by the bearing of the opposite sides of its end flange against the legs 29 of the yoke, the yoke in turn is maintained against lateral movement by the bearing of its legs 29—29 against parallel brackets 34—34 secured to and depending from each side of the sill, over edges of which brackets the cross-head 30 projects being movable lengthwise of the brackets and longitudinal with the hook-bar. These brackets are so formed as to present to the cross-head a vertical edge 35 for preventing an accidental forward movement of the hook-bar when disengaged from the transmission means therefor, and with a supporting edge 36 for preventing the accidental disengagement of the hook-bar from a chain, cable or other transmission means. In other words, when the hook-bar is in its elevated position, the cross-head is depressed to engagement with the vertical edges 35 of the bracket 34, and while being yieldingly held in that position by the spring 26 is prevented from being accidentally depressed through any accidental pull on the hook by the engagement of the yoke with the vertical edges 35 which serve as a stop preventing any depressions of the hook-bar until its rear end is purposely lifted by means now to be described.

Secured to the cross-head 30 by means of a screw-eye 37 or other device, is a cord 38 which passes forwardly and upwardly over a pulley or pin 39 secured to the side of the sill 15 and thence over as many pulleys as may be necessary to conduct it to a pulley 40 supported by a plate 41, secured to the side 11 of the car.

The bar 42 is sleeved on the plate 41 by means of a slot 43, the plate being curved towards one end opposite which is a recess 44 in the side 11 of the car forming a stop for the bar 42 in its movement along the plate 41, a stop pin or lug 45 secured to the plate serving to limit the movement of the bar in the opposite direction.

Bar 42 is provided towards its outer end with a slot forming a hand-hole 46 for shifting the bar when necessary independently of the cord 38 and the springs 47—47 one end of which is secured to the bar and the other end either to the side 11 or plate 41.

Bar 42 is normally against the stop 45 and in its path of movement is a stud 48 supported by a post 49 or other fixtures at the side of the frame-work or track supporting the car, with which stud the bar 42 engages during the forward movement of the car with the result that it is moved on the plate 41 until it contacts with the stop 44, or is thrown out of engagement with the stop 48 by its inward movement towards the car due to the curvature of the plate 41 at a point between the stops 44 and 45.

The contact of the bar 42 with the stud 48 during the forward movement of the car causes the bar to overcome the resistance of the spring 47 and at the same time exert a pull on the cord 38, which if the hook-bar 22 has its rear end depressed in contact with the vertical surface 35 of the bracket 34, will lift the yoke of the hook-bar above the same and forwardly over upon the horizontally supporting edge 36 of the bracket 34, with the result that the point of the hook-bar will be depressed to the plane necessary for it to engage its transmission means whether it be a chain or rope.

At a point between the rails of the track for the car, and preferably supported by the cross-ties 18 thereof, is a power transmission means for the car comprising among other things (see Figs. 1, 4, 6 and 7) a chain the links of which are composed of parallel side bars or plates 50 joined at each end by rods 51, but any other form of chain or a cable may be substituted therefor without a departure from the spirit of my invention.

When a chain transmission means is employed, it is preferably supported by opposing rollers 52 provided with flanges at their outer ends to prevent the lateral displacement of the chain therefrom and with a clear space between their inner ends by means of short shafts 53—53 secured towards the upper end of one lug and a bracket 54, the other end horizontal leg of which is fastened to the cross-tie 18 by one or more spikes 55. This pulley and chain structure is substantially inclosed by means of opposing channel bars 56—56, as shown in Fig. 7, of length at each side thereof so as to leave between their opposing edges a slot 57, for the passage therethrough of the hook-bar engaging with the chain or other transmission means.

The channel bars 56 may be of any desired or convenient length but preferably have their adjacent ends terminate at each side of the roller supporting brackets for the purposes of convenient access to the rollers and the bodily insertion in and removal of the brackets and rollers from the channel bars, the channel bars being secured in position by brackets 58.

The opening between the ends of the channel bars to the rollers is preferably closed by a gate 59 which may be provided with a hand-hole 60 and confined between over-lapping bars 61 secured to the channel bars.

In order to leave no top opening in the channel bars the space between them before referred to may be closed by a plate but instead thereof the outside and under side walls of the channel bars may be partly cut away in each at the point of their juncture or such cut be made wholly in a single bar and thereby provide the desired opening for the introduction and removal of the supporting rollers and their protection above the plane of the lower side of the bar, as shown in Figs. 6 and 7, and whereby the chain transmission means and the bearing surfaces therefor of the rollers are confined entirely within the channel bar and better protected from exposure to foreign substances.

The form of the inclosing structure shown in Figs. 6 and 7 is designed to be used when the under side or length of a continuous chain or rope transmission need not be closely near its upper surface and when it may be supported by other and less expensive means and require no protection from foreign substances or when the power transmission means extends beyond the limit of movement of the car whether or not such extended portion is used for other purposes. In Fig. 9 however, I have illustrated my invention as adapted to a duplex structure inclosing throughout its length the endless power transmission means and in which the channel bars 56 are supported substantially above the position shown in Figs. 6 and 7 by elongating the brackets 58. Opposing elongated brackets 58—58 are connected about mid-way their height by a channel bar brace 62 which in turn serves as a support for short brackets 63—63 which support the rollers 52 and also mid-way its length, that is to say, transversely of the structure a guard plate 64 which extends the entire length of the inclosing structure and serves to prevent the hook-bar from being projected low enough to engage the cross-bars 62 and particularly the lower half of the chain, while at the same time it also deflects broken ore and other substances liable to fall and remain for an objectionable time upon the lower half of the chain.

In the structures of Fig. 9 lower rollers 65 and of a length greater than the width of a chain, are employed as a support for the latter and are journaled in brackets 66—66 supported upon the ties 18.

It is sometimes desirable to move the chain away from the hook-bar instead of moving the hook-bar away from the chain for the purpose of their disconnection and for this purpose, and as indicated in Fig. 10, so much of both the upper and lower flanges of the channel bars 56 as project immediately over the chain, are removed so that the chain may be depressed by means of an eccentric 67 pivoted in a bracket 68 on the upper flange and guided by a lever 69, as shown in said figure.

The eccentric or other device adapted for depressing the chain or cable transmission means, as may be, when several of them are arranged at intervals of the length of travel of the car provides a convenient means for attendants along the line disconnecting the car from its transmission means at certain points without waiting its arrival at such points, and to do this for any length of time necessary or with short notice but as to a single car or for any number of cars for any length of time.

In Fig. 4 is shown a modified form of the hook-bar structure, that is to say, a bracket 70 provided with a bearing 71 through which the hook-bar 22 may slide without limit except as to its length, to the upper and rear end of which is secured a spring 72, the other end of which is attached to a block 73, or other projection from the car sill 15, which said spring preferably extends on the same line as the hook-bar in order to exert a direct pull thereon.

The function of the spring 72 is to automatically move the hook-bar in an upwardly inclined position and maintain the bar in the plane above the point at which it will engage the power transmission means, and this whenever it is released from the pull of the cord 38 passing over the roller 74 mounted upon the bracket 34 and attached to the cross-head 42 of the yoke shown in Fig. 1.

In operation when it is desired to connect a car with its transmission means, as for example a chain as shown, a pull on the bar 42 will cause the rope 38 to force the hook-bar simultaneously forward on a line downwardly inclined until the hook is projected below the plane of the end bar or other projection designed for connecting it with the power transmission means of the car and if the chain is moving in the direction indicated by the arrow in Fig. 1, the engagement will be with the projection next in rear of the hook, and in this connection it should be observed that the hook may be projected to a point substantially below the upper surfaces of the supporting rollers and reach side portions of the chain without any liability of accidentally engaging the rollers or any other part of the entire structure. On the other hand, this engagement may be at predetermined intervals in the travel of the car by employing post 49 and stud 48 at one side of the car for engaging and actuating the bar 42 as before described.

The form of the hook is such that if the car is moved or moves of itself a little faster than the chain the hook will be automatically disengaged through the operation of its retracting spring shown at 26 in Fig. 1, and 72 in Fig. 4, and that of the retracting spring 47 shown in Fig. 2 for the bar 42.

From the foregoing it will now be understood that an important feature of my invention is the adaptability of the mechanical features employed to be at any time released from the power transmission means at any desired interval thereof and for any purpose and the automatic release of the car from its power transmission means whenever the velocity of the car is greater than that of the transmission means, and which at the same time provides for connecting the car with its transmission means and at any point along its line of travel and the automatic connection of the car therewith when released through the greater velocity of the car as soon as the velocity of the chain exceed that of the car. The advantage of this automatic engagement and disengagement of the car under differing velocities is that the tracks for cars, and particularly ore cars for mines, frequently unavoidably contain a number of both up and down grades, and that for the purposes of economy in time and expense it is desirable to use the momentum of the car exclusive of its action for a portion of its travel by letting it run loose down one grade and as far up as its momentum will carry it on the next grade and to without delay connect it with its transmission means the instant the velocity of the car is below that transmission means and which is an operation that may be performed by my invention. Again for a number of obvious reason both the car and its attendants may be saved from destruction through disarrangements in the machinery or other causes when means are provided as in my invention with certainty for instantly disconnecting the car entirely from its transmission means and with an absence of any liability for its accidental reëngagement therewith.

It should also be understood that while I have shown specifically devices securing these several results, my invention is not limited to the precise arrangement and form thereof. Nor is my invention confined to the propulsion of the car in a forward direction, for on the other hand, the connection of the car with the transmission means may be of such a character that the transmission means will operate to lower the car down instead of pulling it up an incline and which would result from having the direction of the hook-bar structure reversed from that shown in the drawing, but in practice when there is a necessity for using the transmission means to both lower and pull a car another hook-bar structure for that purpose may be placed at the opposite end of the car and arranged as above indicated. In this connection it is proper to add that by providing a car at opposite ends with hook-bar structures, as above indicated, the same endless transmission means may be used to propel the cars both to and fro between any two given points as for example in mill and its dump.

Having described my invention, what I claim and desire to secure by Letters Patent is.

1. Means for propelling cars comprising in combination a car, an endless transmission means therefor, and for a slidable device both connecting and entirely disconnecting said car and transmission means at will at any time during the movement of the transmission means and at any point of the transmission that the car may be, substantially as described.

2. Means for propelling cars comprising in combination a car, a catch-device depending therefrom, means whereby said catch-device may be reciprocated an endless transmission means provided with means adapted to be engaged by said catch-device, and means for moving the catch to engagement and for disconnecting it from the transmission means at will at any time during the movement of the transmission means and when the car is at any point of its travel induced by said transmission means, substantially as described.

3. Means for propelling cars comprising in combination a car, an endless transmission therefor, a catch-device, a support on which said catch slides means for moving said catch on an oblique line relative to and from the plane of its engagement with the transmission and means for automatically producing an automatic connection of the car with its transmission at any point of its travel theron, substantially as described.

4. Means for propelling cars comprising in combination a car, an endless transmission means therefor, a hook-bar, a bearing in which said bar slides in shifting it to and from engagement with the transmission means, means for depressing said bar to the plane of its engagement with the transmission means, and a spring automatically maintaining said bar out of engagement and its hook devices in a plane above the transmission means, substantially as described.

5. Means for propelling cars comprising in combination a car, an endless transmission means therefor, a sliding hook-bar suspended therefrom, means for supporting the rear end of said bar in an elevated position and its hook depressed to the plane of its engagement with its transmission means, means for automatically lifting and maintaining the hook end of said bar above the plane of its engagement with its transmission means, and means for positively maintaining said bar against a sliding movement when its hook is elevated above said plane, substantially as described.

6. Means for propelling cars comprising in combination a car, an endless transmission means therefor provided with bars or other projections, a catch device adapted to engage and retain said projections, a sliding bar connected with said catch device, means for suspending said bar from a car, a cushion reducing the force of a jerk due to the engagement of the car with a faster moving transmission means, and means for simultaneously lifting said bar and cushion and thereby depressing the catch device to the plane of its connection with its transmission means and means for automatically inducing the catch device to connection with and disconnection from said transmission, substantially as described.

7. Means for propelling cars comprising in combination a car, an endless chain transmission means therefor, means for supporting and inclosing said transmission means, a sliding hook-bar and a bearing support therefor suspended from the car, means for moving said hook-bar to engagement with, disengagement from, and maintaining it in a plane above and entirely away from said chain, and a cushion moving with said bar and receiving the force of jerks resulting from the initial engagement of the hook and transmission means, substantially as described.

8. Means for propelling cars comprising in combination a car, an endless transmission means therefor provided with projections at intervals thereof, a catch-device adapted to engage said projections and be disconnected therefrom, a sliding bar supporting said catch device, means pivotally connecting said bar with and suspending it from the car, means for moving said bar to engagement with and disengagement from the transmission means, projections and maintaining it against accidental engagement therewith and therefrom, and a cushion moving with said bar and receiving the force of the jerk due to the initial engagement of the catch device with its transmission means, substantially as described.

9. Means for propelling cars comprising in combination a car, an endless transmission means, supporting rollers therefor, between the opposing ends of which there is a clear space, an angle iron structure provided at its upper side with a continuous slot registering with said space, a hook device, a bar connected therewith, means suspending said bar from a car and means for directing said bar through the slot of the transmission structure to the plane of its engagement with the transmission means, substantially as described.

10. Means for propelling cars comprising in combination a car, a depressible bar suspended from said car, a catch device supported by said bar, an endless transmission means therefor, provided at intervals with projections adapted to engage and hold said bar, separated roller supports for said transmission means, and opposing channel bars separated at the edges and otherwise inclosing the transmission means and the supporting surface contacting therewith, substantially as described.

11. A car haul comprising a car, endless transmission means therefor, a hook-bar, a bearing in which said bar is adapted to move to and from engagement with said transmission means, means for depressing said bar to engagement with said transmission means, and automatic means for maintaining said bar from engagement with said transmission means.

12. In a car haul, a car, endless transmission means therefor, a movable hook-bar suspended from said car, means for attaching said bar to some substantial part of said car in a longitudinally slidable manner, means for cushioning the end thrust of said bar, means for depressing the hook end of said bar to engagement with said transmission means, and automatic means for raising and maintaining the hook end of said bar from engagement with said transmission means.

13. Means for propelling cars comprising a car, endless transmission means therefor, a movable bar attached to said car and depending therefrom, means for engaging the lower end of said bar with said transmission means, means for cushioning the end thrust of said bar, means for depressing the lower end of said bar to engagement with said transmission means, and automatic means for raising and maintaining said bar from engagement with said transmission means.

14. Means for propelling cars comprising a car, an endless transmission apparatus therefor, means for supporting and inclosing said transmission apparatus, a longitudinally movable hook-bar and a bearing support therefor suspended from said car, means for placing said hook-bar in engagement with said transmission apparatus, means for disengaging said hook-bar from said transmission apparatus, means for maintaining said hook-bar above and out of contact with said transmission apparatus, and cushioning means moving longitudinally with said bar adapted to receive the thrust of said bar when engagement with said transmission apparatus is made.

In witness whereof, I have hereunto set my hand this 2nd day of October, 1906.

ROBERT G. COYNER.

Witnesses:
ETHEL K. MANCHESTER,
JNO. G. ELLIOTT.